Figure 1:
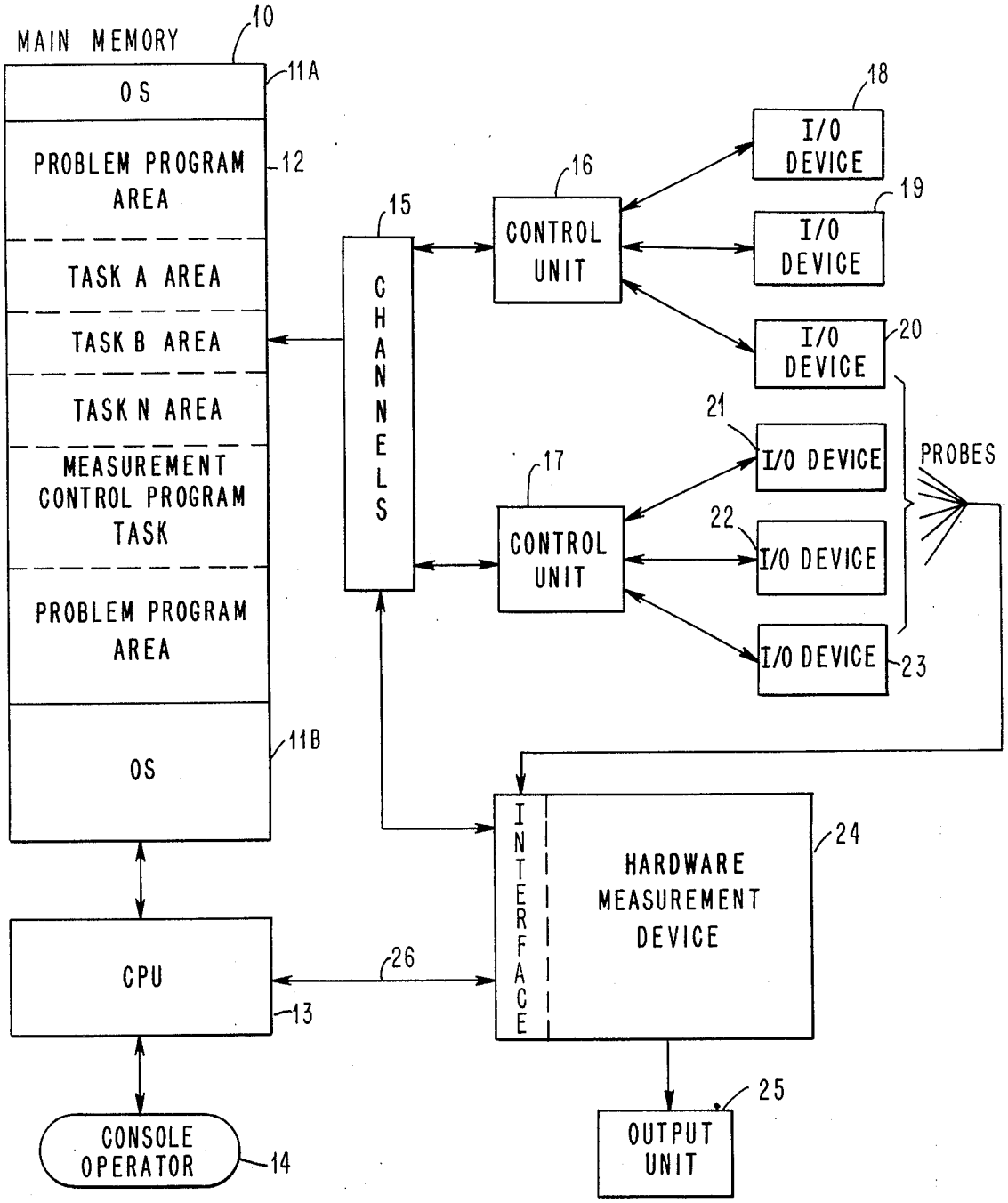
Figure 2:
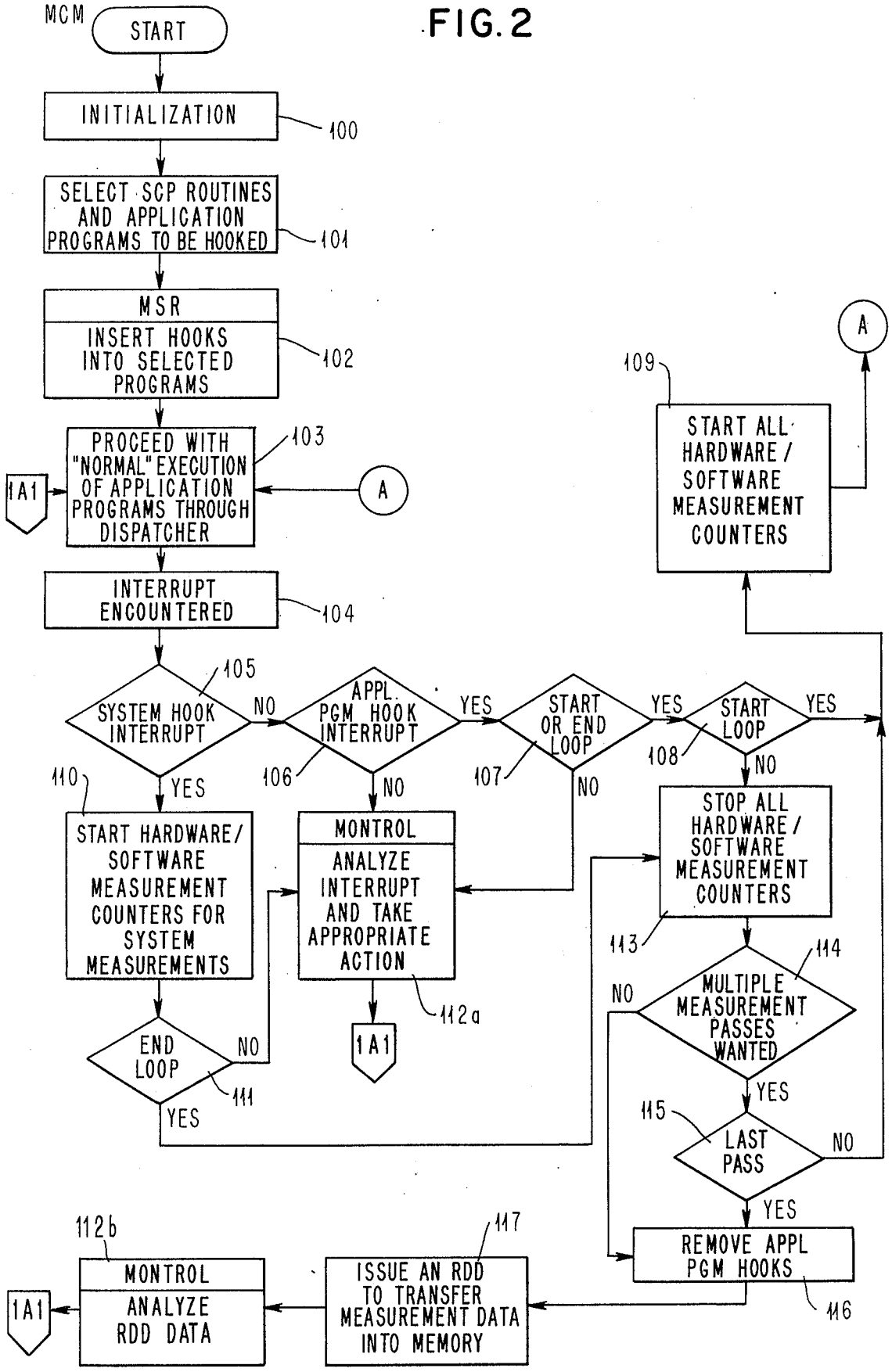
Figure 3A:
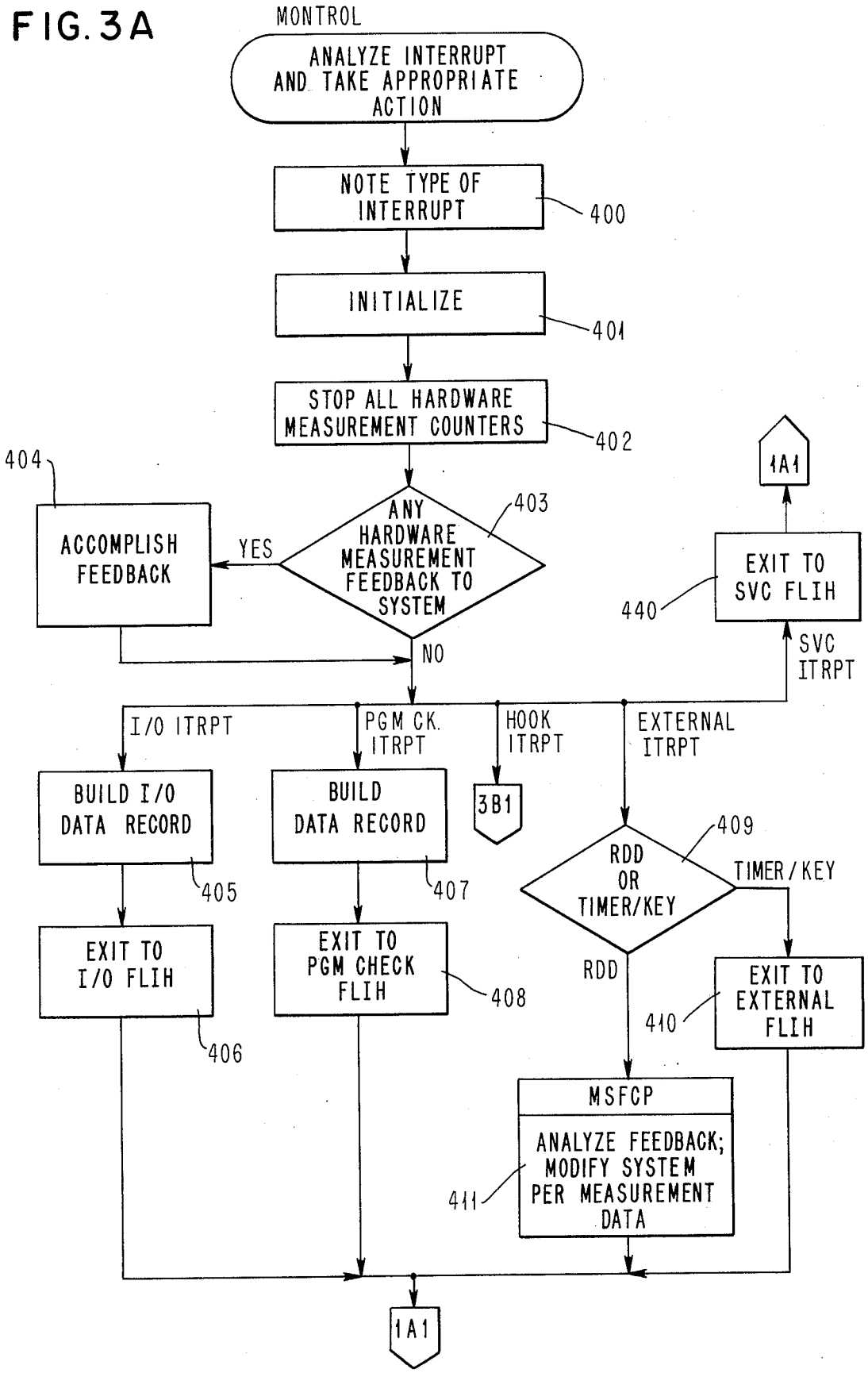
Figure 3B:
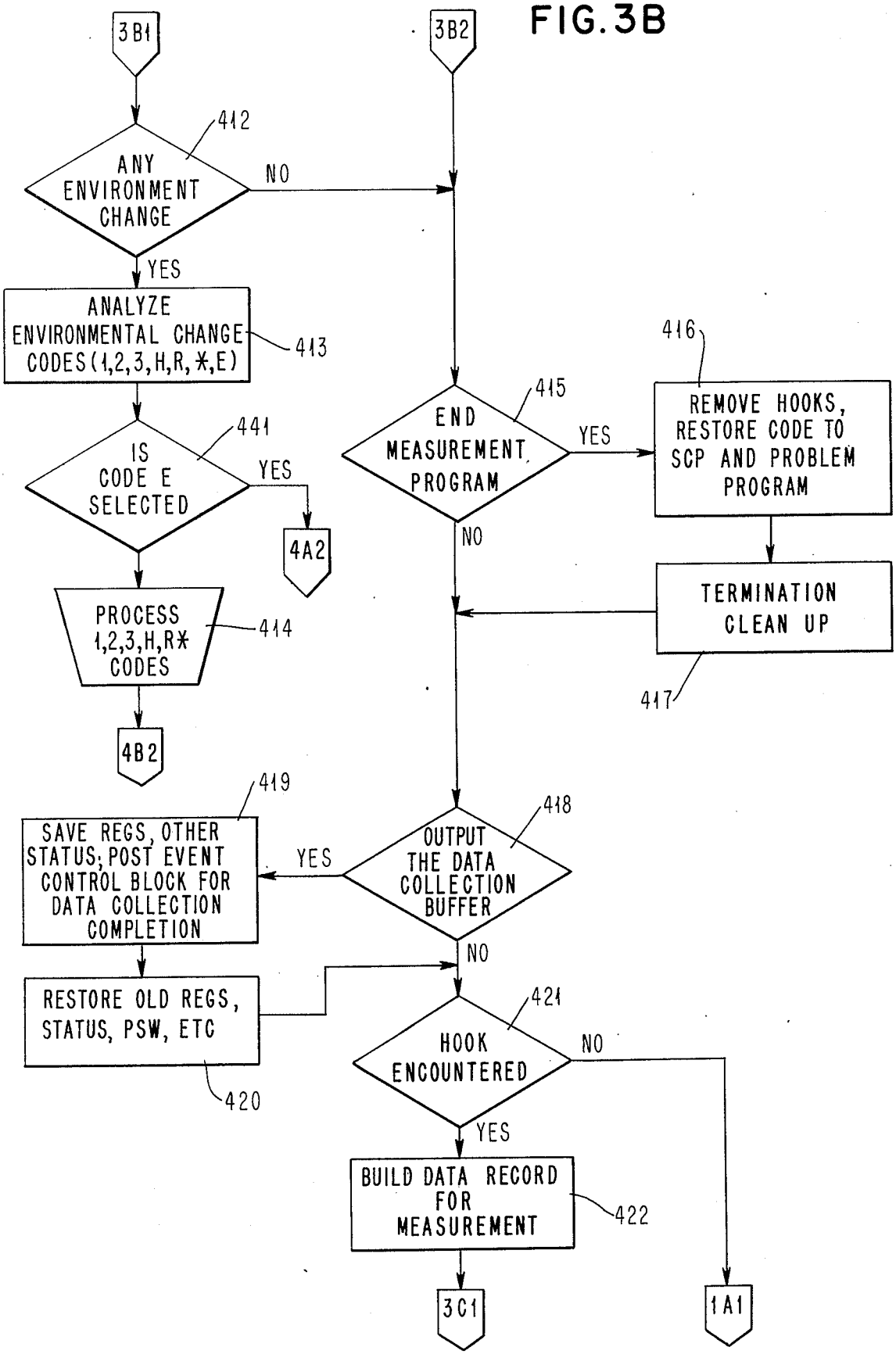
Figure 3C:
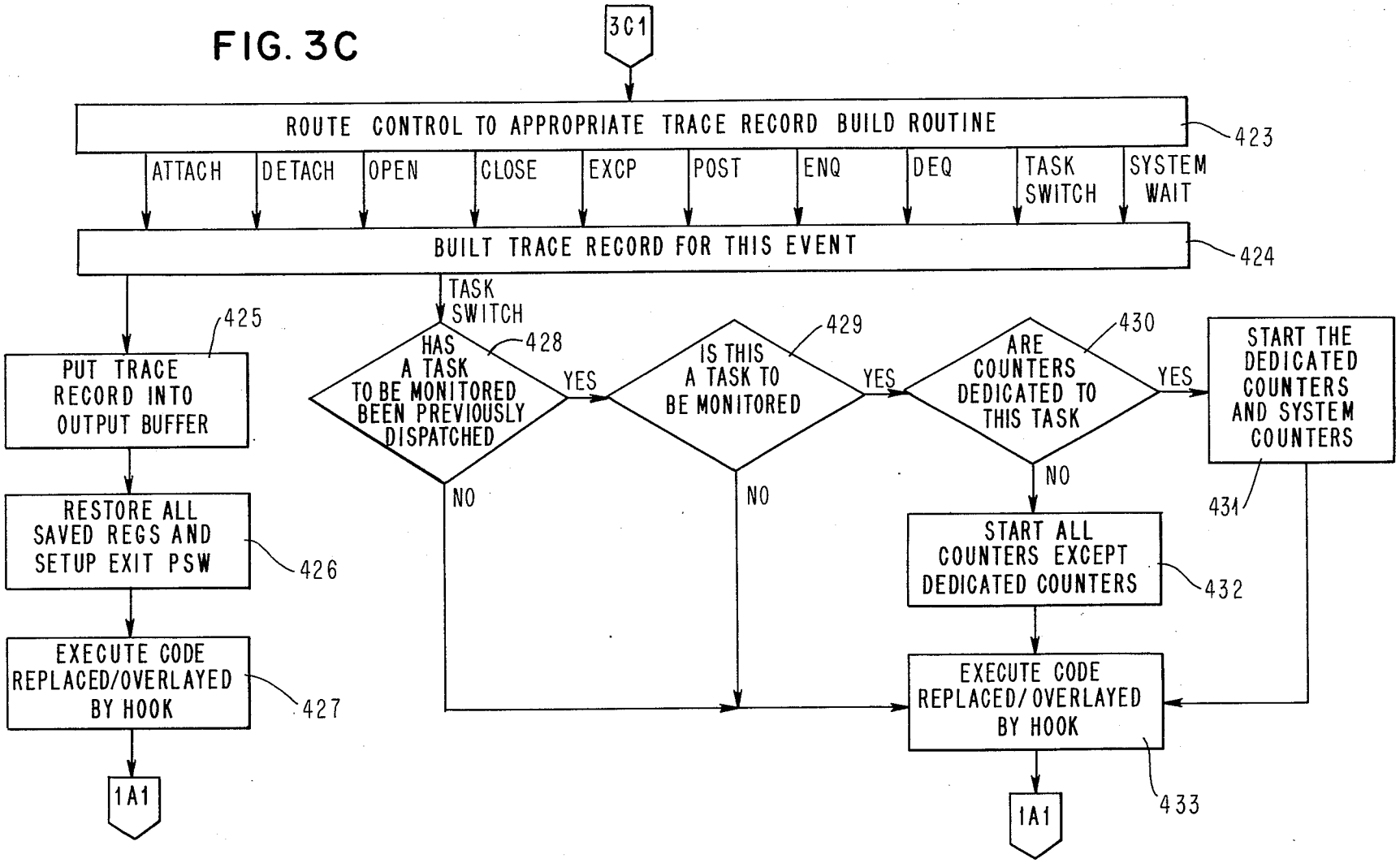
Figure 4A:
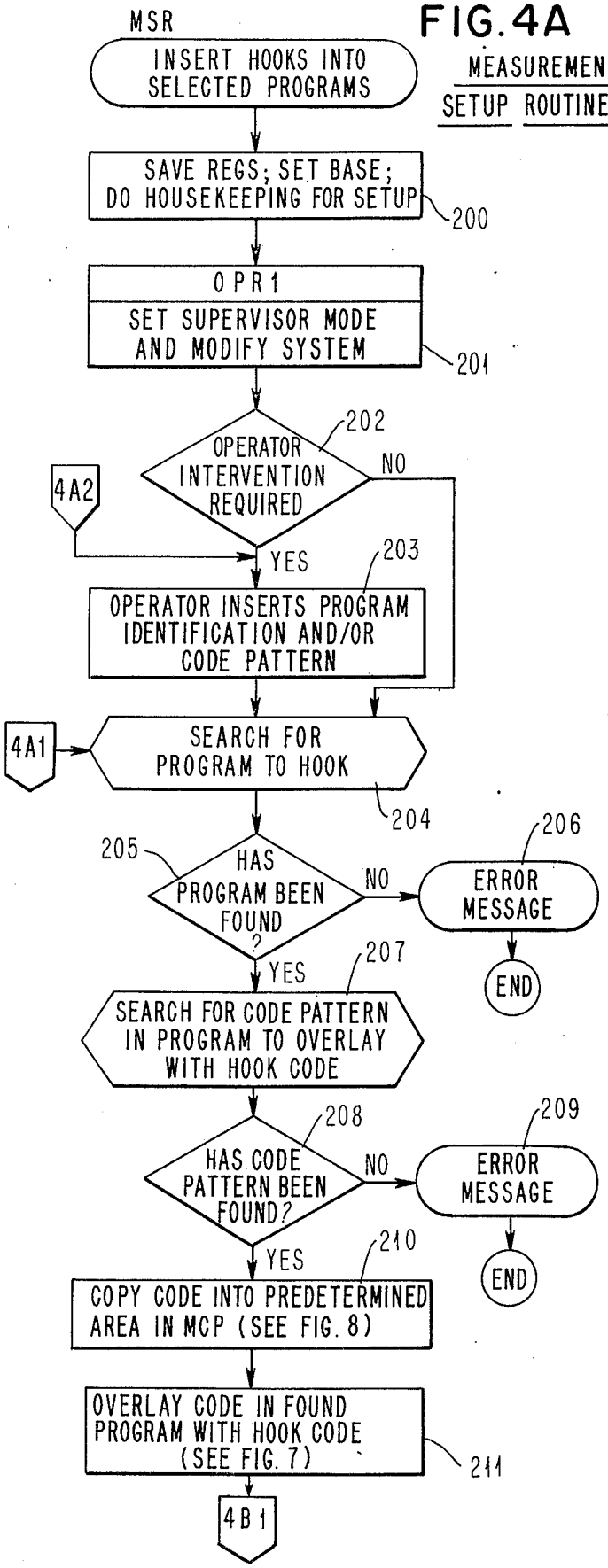
Figure 4B:
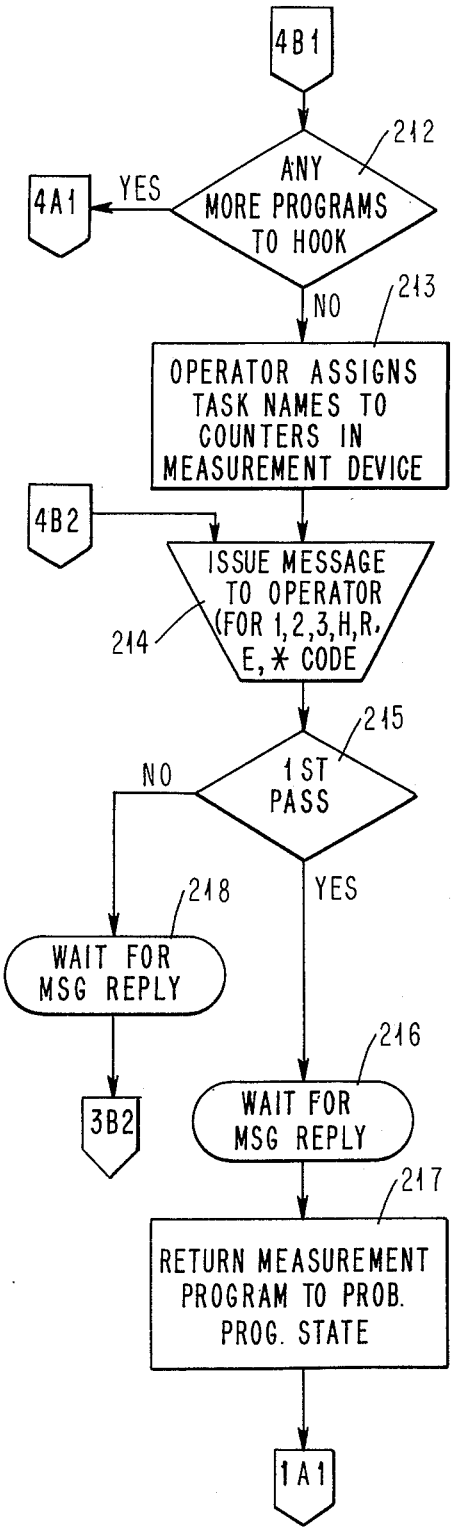
Figure 5:
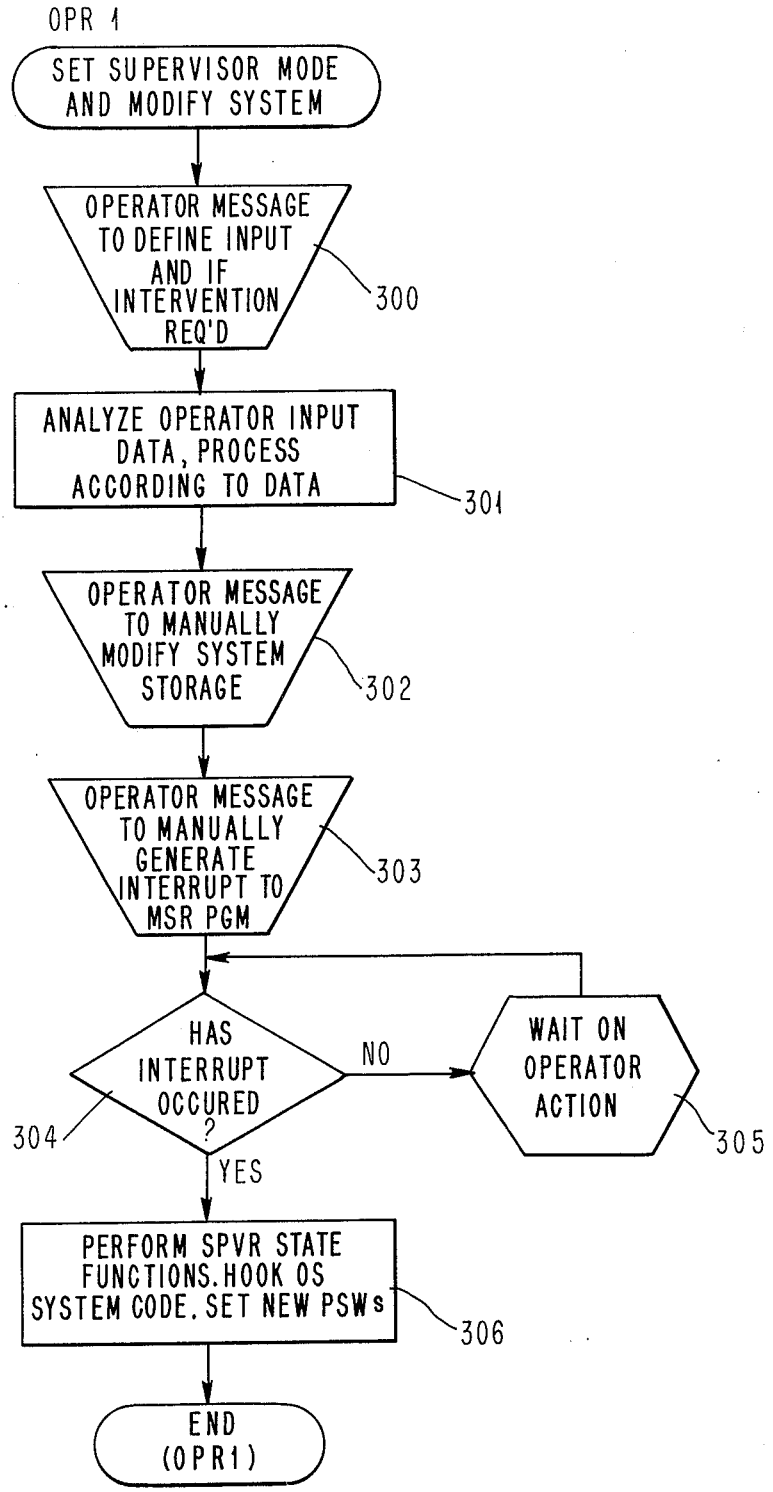
Figure 6A:
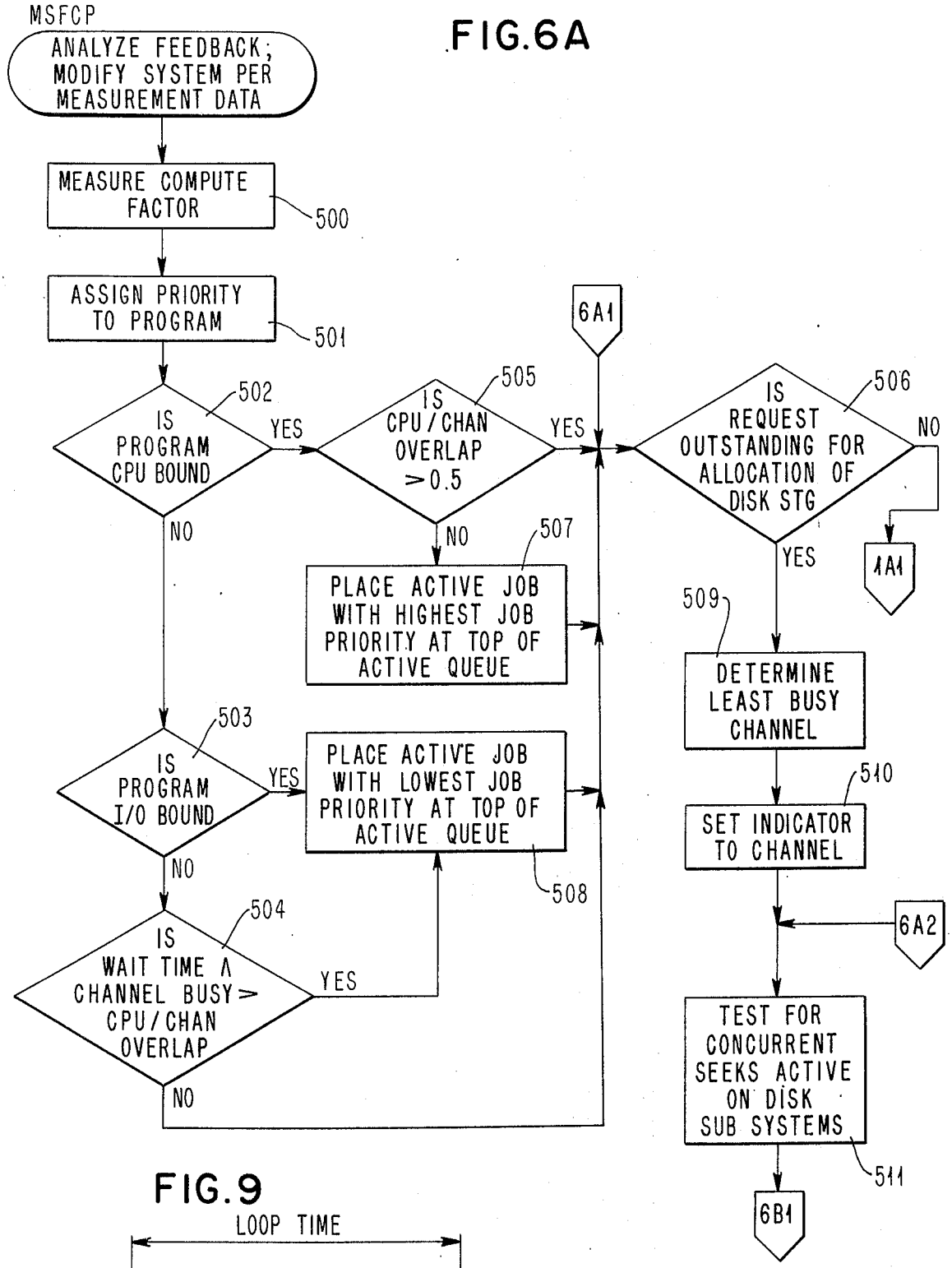
Figure 9:
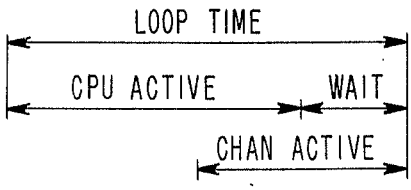
Figure 6B:
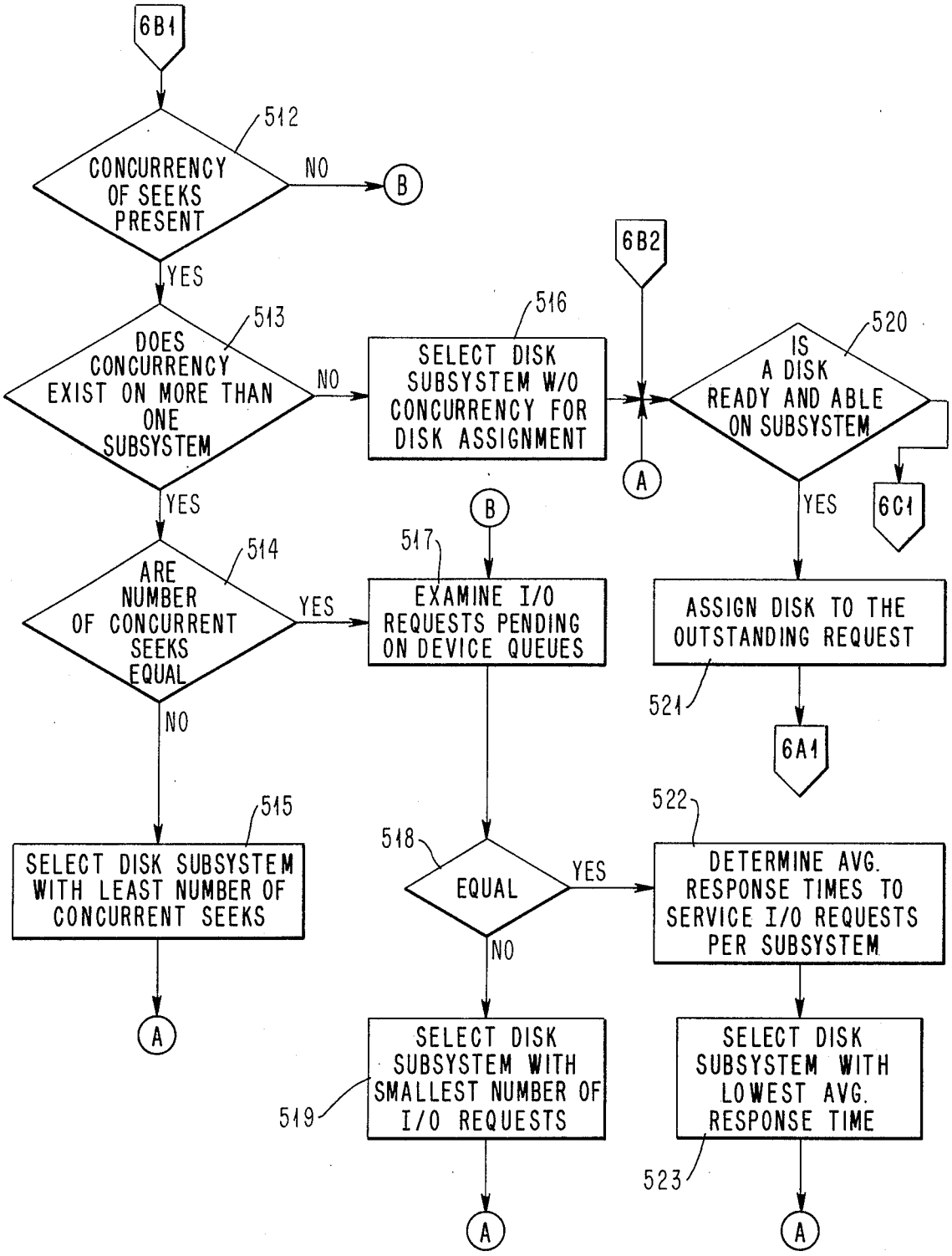
Figure 6C:
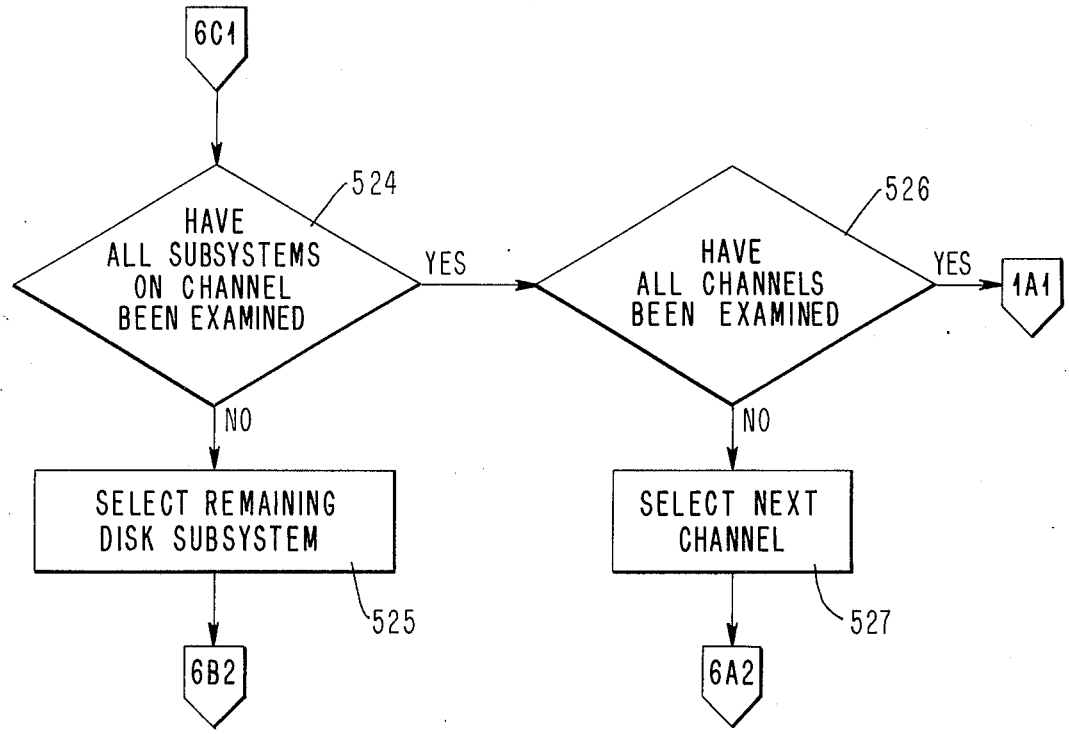
Figure 7:
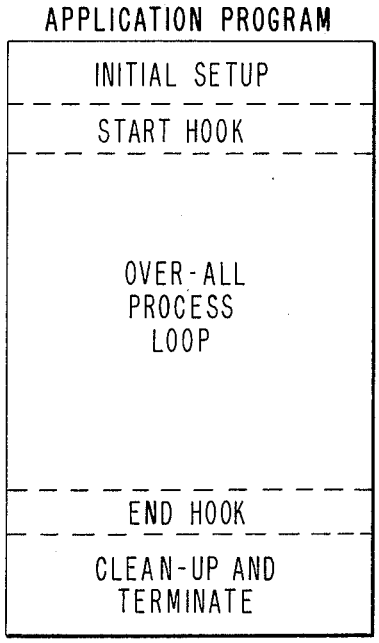
Figure 8:
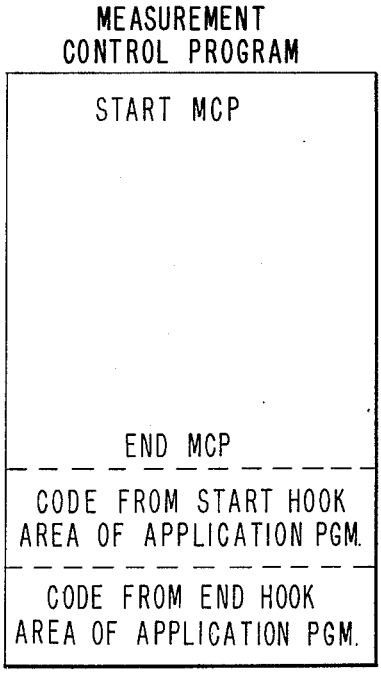

United States Defensive Publication [19] (H) [11] T955,010

Ragonese et al. [43] Feb. 1, 1977

[54] HARDWARE/SOFTWARE MONITORING SYSTEM

[75] Inventors: Ronald R. Ragonese; Franklin D. Schulman, both of Poughkeepsie, N.Y.

[73] Assignee: International Business Machines Corporation, Armonk, N.Y.

[21] Appl. No.: 713,772

[22] Filed: Aug. 12, 1976

Related U.S. Application Data

[63] Continuation of Ser. No. 557,697, March 12, 1975, which is a continuation of Ser. No. 424,969, Dec. 14, 1973, abandoned, which is a continuation of Ser. No. 302,442, Oct. 31, 1972, abandoned.

[51] Int. Cl.[2] ..... G06F 9/06

[52] U.S. Cl. ..... 444/1

[57] ABSTRACT

A machine-implemented method of controlling, through software, the collection of data relating to the performance of a data processing system, where the data is gathered by hardware monitoring equipment and/or software monitoring methods whereby a simultaneous or separate hardware/software view of system and application program activity is obtainable. The method provides for immediate feedback of all hardware and software collected data into main memory for automatic, dynamic reconfiguration/modification of the system to improve operating efficiency. Specific examples of dynamic reconfiguration/modification include a method for maximizing the simultaneous utilization of processor/storage, i.e., maximizing CPU/-channel overlap, maximizing the transfer of data over a channel, maximizing the number of data requests to a subsystem, and minimizing the time for an I/O request to be stacked in a queue.

47 Claims, 11 Sheets Drawing,

57 Pages Specification

The file of this unexamined application may be inspected and copies thereof may be purchased (849 O.G. 1221, Apr. 9, 1968).

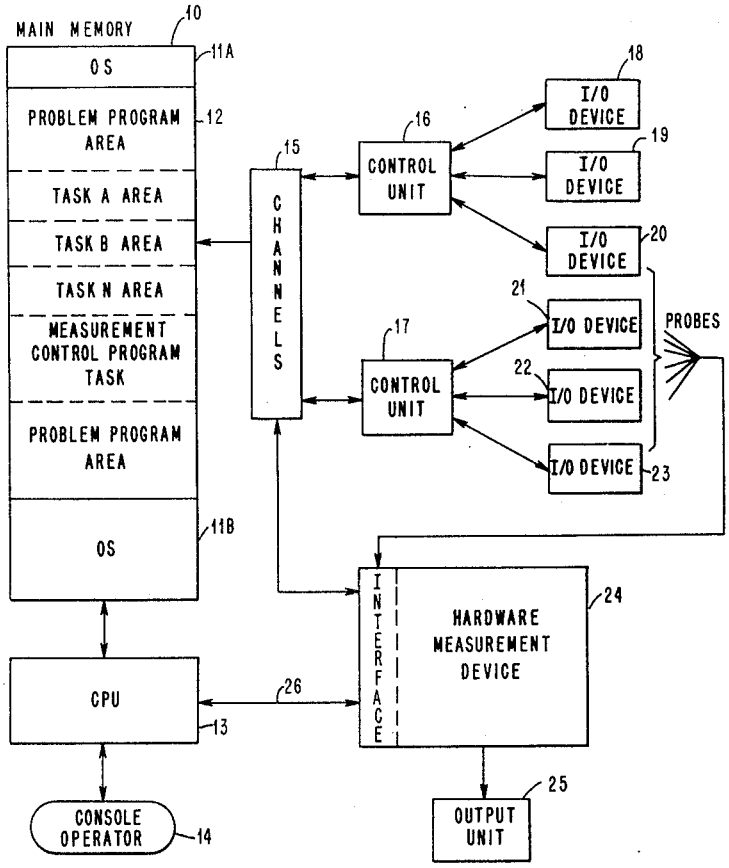

MEASUREMENT SETUP ROUTINE (MSR)

FIG. 10

TRACE RECORDS

ATTACH-DETACH (0, 1, 4, 12, 20 (BYTES))

| | | | |
|---|---|---|---|
| A / 1K | EVENT TIME | JOB NAME OR PROGRAM NAME | STEP NAME OR PROGRAM NAME |

ENQUEUE DEQUEUE (0, 1, 4, 12, 24)

| | | | |
|---|---|---|---|
| Q / X / R / W | EVENT TIME | Q-NAME LAST NAME | R-NAME (R-NAME OF RESEARCH (UTOC,)) |

POST (0, 1, 4, 8, 12, 16)

| | | | | |
|---|---|---|---|---|
| P | EVENT TIME | I/O OLD PSW LEFT HALF | ECB ADDRESS | RB ADDRESS OR WAIT+POST BIT WAIT COUNT |

EXCP (0, 1, 4, 5, 8, 9, 12, 13, 20)

| | | | | | | | | |
|---|---|---|---|---|---|---|---|---|
| E | EVENT TIME | DCB OPEN FLAGS | UCB FLAGS NO.1 | DCB ADDR. | K0 | ECB ADDR. | EXTENT NO. IN DEB | DASD LOCATION / MBBCCHHR |

OPEN (0, 1, 4, 8, 16, 18, 20)

| | | | | | |
|---|---|---|---|---|---|
| O | EVENT TIME | DCB ADDR | DD NAME | MACRO REFERENCES | DEVICE TYPE RECORDING TECHNIQUE |

CLOSE (0, 1, 4, 5, 8, 10, 12, 14, 16)

| | | | | | | | |
|---|---|---|---|---|---|---|---|
| C | EVENT TIME | K0 | DCB ADDR. | TAPE-BLOCK COUNT D/A-TRACKS FOR EXTENTS. OR ZERO | FLAG BYTES 1 & 2 | BLOCK SIZE | DS ORG. |

SYSTEM WAIT (0, 1, 4)

| | |
|---|---|
| S | EVENT TIME |

TASK SWITCH (0, 1, 4, 5, 8, 12) (ADDR. OF MOTHER TASK)

| | | | | |
|---|---|---|---|---|
| T | EVENT TIME | K0 | TCB ADDR. | TC BOTC ADDRESS |

(0, 1, 4, 5, 8)

| | | | |
|---|---|---|---|
| T | EVENT TIME | K0 | TCB ADDRESS |

I/O INTERRUPT (0, 1, 4, 8, 16)

| | | | |
|---|---|---|---|
| I | EVENT TIME | I/O OLD PSW (LEFT HAND) | CSW |

END OF FILE (0, 1, 4, 8, 12, 16)

| | | | | | |
|---|---|---|---|---|---|
| 00 | NO TIME | SVCLIB, DCB ADDRESS | LINKLIB, DCB ADDRESS | JOB QUEUE POINTER | IGNORED SVC COUNTER |

STATUS (0, 1, 2, 4, 10, 11, 12)

| | | | | | |
|---|---|---|---|---|---|
| * | STATUS A BYTE | S/360 CHANNEL UNIT ADDRESS | VOLID | DEVICE CLASS | UNIT TYPE |